April 16, 1935.  H. T. ARENDS  1,998,114

RABBETING SAW

Filed Nov. 29, 1933

INVENTOR.
Herman T. Arends
BY Swan, Frye & Hardesty
ATTORNEYS.

Patented Apr. 16, 1935

1,998,114

UNITED STATES PATENT OFFICE 1,998,114

RABBETING SAW

Herman T. Arends, Highland Park, Mich.

Application November 29, 1933, Serial No. 700,203

1 Claim. (Cl. 145—31)

This invention relates to rabbeting saws, and particularly aims to provide an extremely simple and inexpensive tool especially suitable for forming small slots along and relatively close to the edge of work having a straight side. The slotting of a stack or block of papers, magazines, or the like in a manner adapted to provide means whereby they may be secured in a binder constitutes one of the uses to which this improved tool is especially fitted.

In conjunction with binders of the general form shown in my copending application Serial No. 700,202 filed Nov. 29, 1933, it is desirable that there be supplied a suitable saw for slotting or rabbeting the papers, magazines, or other material to be bound. Since the binders themselves must be sold in a competitive market where price is important, costs must be kept as low as possible, and since it is desired to furnish the slotting or rabbeting saw with the binders, either free of charge or at a very low price, it is important that the saw be as simple and inexpensive in construction as possible, despite which it must be a practical, effective and easily usable tool by which slots of uniform size and position may be formed in the edges of the material to be bound. The provision of a tool incorporating these desirable attributes constitutes the primary object of this invention.

Another object of this invention is the provision of a holder adapted to receive a standard sawblade of the hack saw or a similar type, and to hold the same in such manner that the assembly constitutes an efficient saw of the type referred to, yet so inexpensive in its nature that the holder may be discarded with the saw blade when the latter becomes dulled or worn out.

A further object is the provision of such a saw in which the blade is so mounted and held as to make accidental breaking thereof virtually impossible.

Other objects and advantages will be apparent from the following description wherein reference is made to the accompanying drawing illustrating preferred embodiments of my invention, and wherein similar reference numerals designate similar parts throughout the several views.

Figure 2:
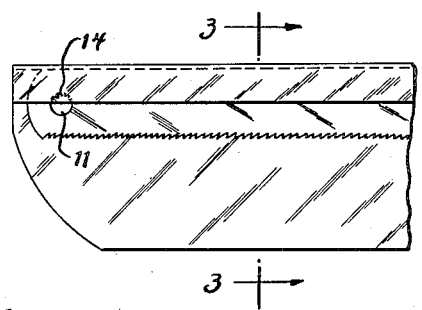
Fig. 2 is an enlarged front elevation of one end of the saw.
Figure 3:
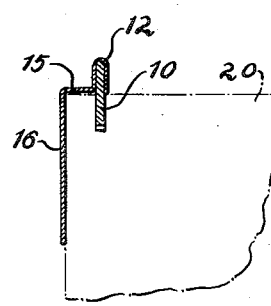
Figure 4:
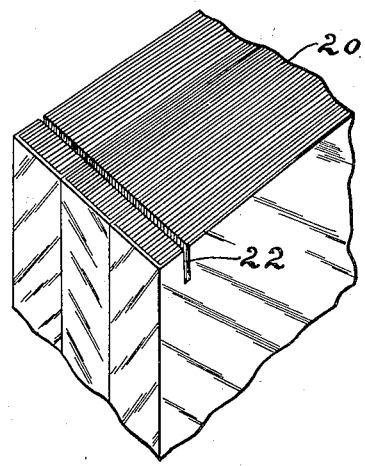

Fig. 3 is a vertical section taken substantially on the line 3—3 of Fig. 2 and looking in the direction of the arrows, indicating the position of the work with relation to the tool when the latter is in use; and Fig. 4 is a fragmentary perspective view illustrating typical work performed by the tool, the view showing several pamphlets of the magazine variety and of uniform size, which have been rabbeted by means of my improved saw.

Referring now to the drawing, reference character 10 designates a saw blade, which may comprise a standard hack saw blade of the sort commonly available, and ordinarily sold for replacement in hack saw frames. The blade may be of any desired dimensions and provided with holes near its ends, as at 11. A combined gauging frame, holder, and handle for manipulating the blade is constituted by a single sheet metal element bent to the form shown in the drawing, and the upper portion 12 of which is folded over and clamped against the blade to retain the same. The security with which the blade is held may be enhanced by indenting the holder portion 12, as at 14, to force the metal of the holder portion into the holes 11.

Figure 1:
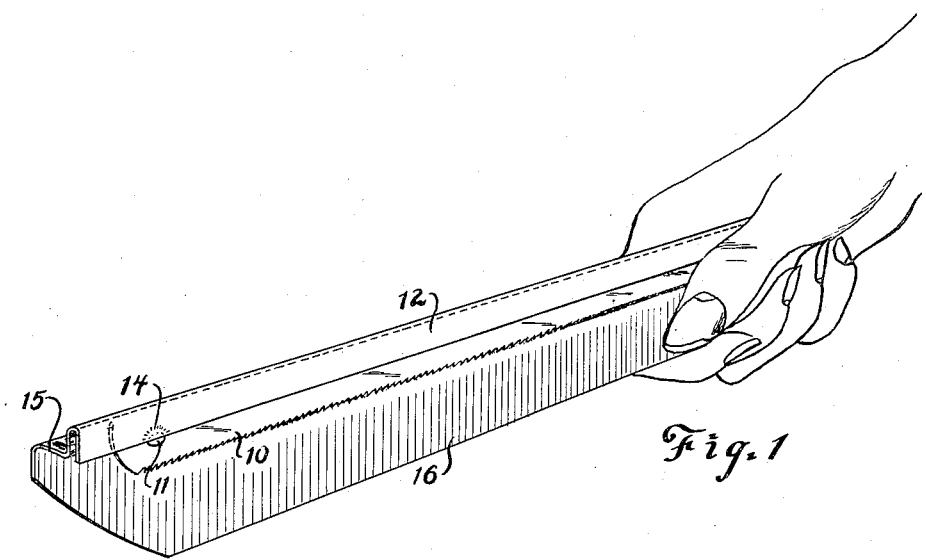
Fig. 1 is a perspective view of one of my improved rabbeting saws, indicating the manner in which it is usually held in use.

Integral with the holder portion 12 is an offset connecting portion 15, the width of which determines the gauge of the tool, that is, the spacing between the rabbet and the edge of the work. A downwardly projecting abutment portion 16 also constitutes an integral portion of the sheet metal blank of which the portions 12 and 15 are formed and projects downwardly from the edge of the latter and below the cutting teeth of the blade. Its width is such that when the end of the tool is grasped, with the palm of the user's hand outside the portion 16, as indicated in Fig. 1, the fingers cannot be uncomfortably pressed against the teeth of the saw, although the width of the portion 16 is sufficient to facilitate a firm grip, so that the entire end of the tool, although usable as an active part of the same, constitutes a convenient handle portion, in cooperation with the upper parts 12—15 over which the thumb and top of the hand may rest. The saw is applied to the work (designated 20) in the manner indicated in Fig. 3, the guiding member 16 being pressed against the side of the work during sawing movement of the tool. The blade during such use of the tool acts to cut a slot of predetermined relative positioning adjacent the edge of the work, in the manner indicated in Figs. 3 and 4; in the latter of which figures a completed slot is shown, designated 22.

While it will be apparent that the illustrated embodiments of my invention herein disclosed are well calculated to adequately fulfill the objects and advantages primarily set forth, it is to be understood that the invention is subject to variation, modification and change within the spirit and scope of the subjoined claim.

What I claim is:

A saw comprising an elongated saw blade having a toothed edge and a back edge, a combined blade-supporting, gauging and handle element comprising a sheet metal blade retaining portion folded over the back edge of the blade and crimped against the opposite sides thereof but not covering the toothed edge, a laterally extending gauging portion formed integrally with said retaining portion, and an abutment and handle portion formed as an integral continuation of said gauging portion and extending from a portion thereof spaced from the blade in substantial parallelism to the blade and sufficiently far beyond the toothed edge thereof to enable tightly grasping said element without undue engagement between the fingers and the teeth.

HERMAN T. ARENDS.